P. TOVSEN.
SHOCKER.
APPLICATION FILED JULY 14, 1917.
1,261,653.
Patented Apr. 2, 1918.
2 SHEETS—SHEET 1.
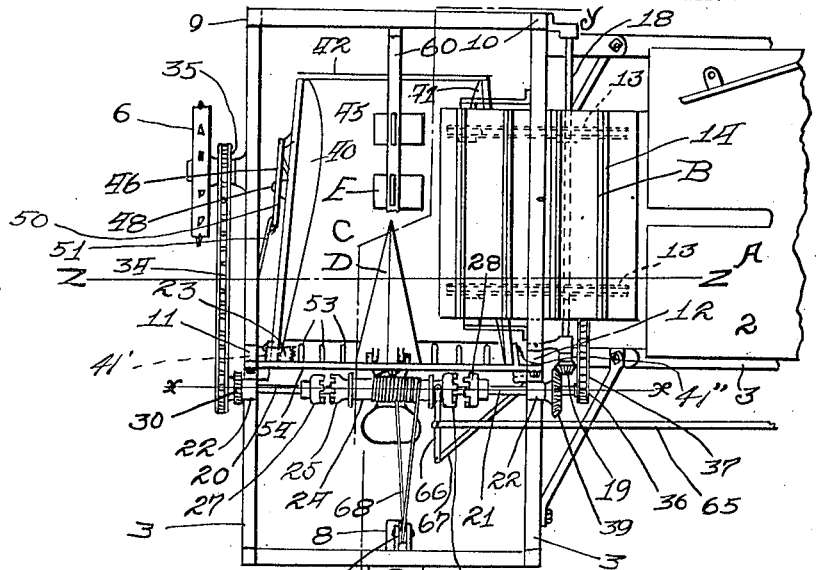
Inventor:
Peter Tovsen
by: F. S. Bradbury
Attorney.

P. TOVSEN.
SHOCKER.
APPLICATION FILED JULY 14, 1917.

1,261,653.

Patented Apr. 2, 1918.
2 SHEETS—SHEET 2.

Inventor:
Peter Tovsen
by:
Attorney.

UNITED STATES PATENT OFFICE.

PEDER TOVSEN, OF MINNEAPOLIS, MINNESOTA.

SHOCKER.

1,261,653. Specification of Letters Patent. Patented Apr. 2, 1918.

Application filed July 14, 1917. Serial No. 180,637.

*To all whom it may concern:*

Be it known that I, PEDER TOVSEN, a citizen of the United States, residing at Minneapolis, in the county of Hennepin and State of Minnesota, have invented a new and useful Improvement in Shockers, of which the following is a specification.

This invention relates to improvements in shockers, and has for its primary object the production of simple, inexpensive and efficient means for collecting bundles as they are formed by a harvesting machine, and periodically depositing them in the form of shocks standing in upright position upon the ground.

Figure 4:
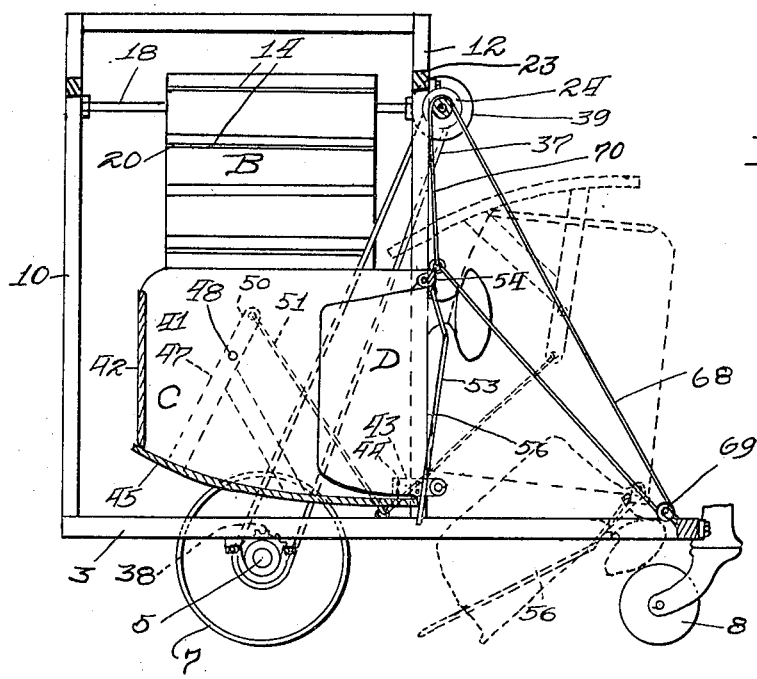
Figure 5:
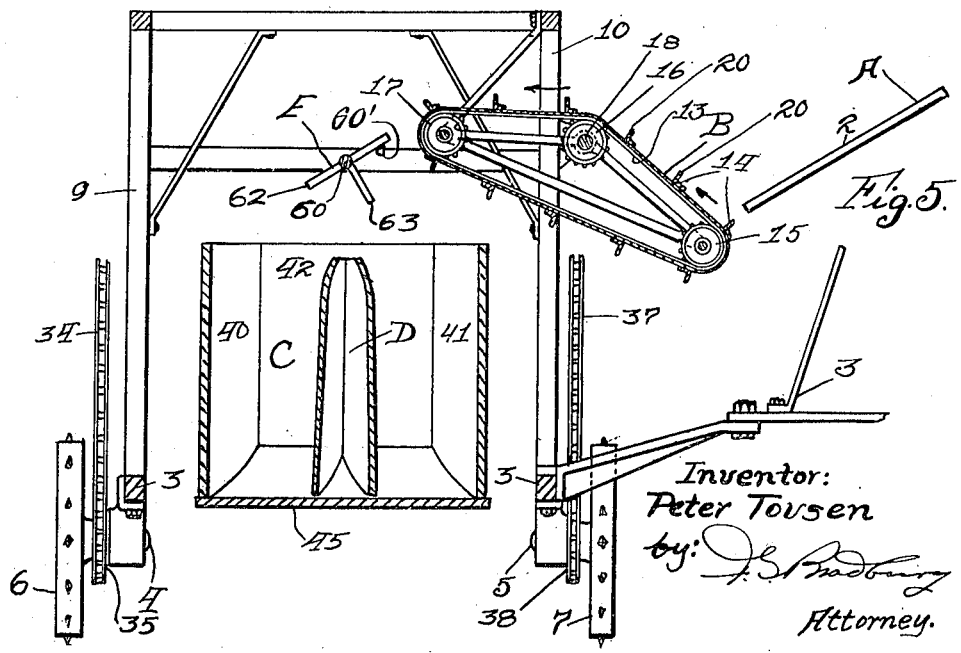

In the accompanying drawings forming part of this specification, Figure 1 is a plan of my improved shocker, a portion of the harvesting machine to which the shocker is attached being illustrated; Fig. 2 is a side elevation of the construction illustrated in Fig. 1; Fig. 3 is a section of a detail taken on the line X—X of Fig. 1; Fig. 4 is a section taken on the line Y—Y of Fig. 1, and Fig. 5 is a section taken on the line Z—Z of Fig. 1.

In the drawings, let A indicate a portion of a harvesting machine having the usual bundle forming board 2 on which the grain is formed into bundles and then released and allowed to slide downwardly. At the lower end of this bundle forming board is secured by the frame work 3 my improved shocker, said frame work being journaled upon two shafts 4 and 5, which are mounted upon the carrier wheels 6 and 7. The forward end of the frame work is supported by a forwardly disposed caster wheel 8 which is free to guide in the direction in which the device is moving. The frame work 3 is provided with standards 9, 10, 11 and 12 arranged to assist in supporting the movable parts of my improved shocker.

Disposed at the lower end of the bundle forming board 2 is a carrier B having a slatted belt composed of chains 13 and slats 14, said chains traveling over the sets of sprocket wheels 15, 16 and 17, which are suitably journaled upon the frame work. The sprocket wheels 16 are mounted upon the shaft 18, which is journaled upon the frame work and driven by the pinion 19 on its forward end to be hereinafter described. The slats 14 carry suitable flights 20, which are adapted when the belts are driven in the direction of the arrows illustrated in Fig. 5 to engage and carry the bundles as they are received from the bundle forming mechanism of the harvester and deposit them on their sides into a basket C forming part of my improved shocker to be hereinafter described. Journaled upon the upper ends of the forward standards 11 and 12 in alinement are two stub shafts 20 and 21, said shafts being mounted in the journals 22 which are secured to said standards, there being a beam 23 arranged across the upper ends of said standards to reinforce the strength of the structure. The inner ends of the shafts 21 and 22 have freely journaled and slidably disposed thereon a winding drum 24, the ends of which carry driven clutch elements 25 and 26, which are adapted to respectively engage one of the driving clutch elements 27 and 28 at a time, which are carried respectively upon the shafts 20 and 21 when the drum is slid in either direction upon said shafts. The outer end of the shaft 20 carries a gear wheel 30, the teeth of which mesh with another gear wheel 31 mounted upon the frame, (see Fig. 2), the last mentioned gear wheel being mounted upon a stub shaft 32 journaled upon the frame and carrying a sprocket 33, over which a chain belt 34 travels, said chain belt being driven by a sprocket 35 mounted upon the shaft 4. The other shaft 21 is driven by a sprocket 36 mounted thereon, a chain belt 37 and a driving sprocket 38, said last mentioned drive sprocket being mounted upon the shaft 5. Thus the two shafts 20 and 21 are driven in opposite directions simultaneously by the carrier wheels 6 and 7. A bevel gear 39 on shaft 21 transmits power to the pinion 19 and assists in driving carrier B continuously when the harvester travels.

The basket C which is arranged within the frame work is in the form of a skeleton frame having two downwardly and rearwardly converging sides 40 and 41, and a rearwardly disposed vertical end 42 secured to said sides and assisting in bracing or buttressing them to form a rigid structure. The forward ends of the sides 40 and 41 are pivoted at their lower ends by the cleats 43 to the lower ends of the uprights 11 and 12 by the bolts or pins 44, so that the basket frame produced partly by said sides and rearward end wall are free to tilt as a unit from normal position, when it is adapted to receive the bundles from the carrier B, into the broken line position illustrated in Fig. 4, in which latter position the bundles are deposited upon the ground where they are left standing when the carrier frame moves forwardly. The basket C is provided with a floor 45, which is mounted upon the side frames 46 and 47, said frames respectively being pivoted by the pivot connections 48 upon the side walls 40 and 41, so that the floor is free to move from closing or normal position as illustrated by the full lines in Fig. 4 into open position as illustrated by the broken lines in said figure, when the basket deposits the bundles upon the ground. The ends 50 of the side supporting frames 46 and 47 project upwardly above the pivot connections 48 and are attached by the flexible connections 51, such as cables, to the frame work 3 below the basket near its forward end. The bundles as they are formed by the harvester and transferred into the basket by the carrier are received in the basket with their sides resting upon the floor 45, and their butt ends extending forwardly, so that when the basket is tilted from bundle receiving position into ejecting broken line position illustrated in Fig. 4, they are deposited with their butt ends standing upon the ground. The floor which simultaneously rises during the tilting action of the basket into the broken line position illustrated in Fig. 4 allows the bundles to remain standing in the form of a shock on the ground as the shocker moves ahead.

To prevent the bundles from sliding forwardly out of the basket before the basket is tilted upwardly to eject the bundles, a suitable number of downwardly depending guard rails 53 are freely hung upon a cross member 54, which is carried across the upper forward end of the basket and supported by the side walls 40 and 41 at 41′ and 41″. The lower ends of these rails drag freely on the ground when the basket is tilted into bundle ejecting position, but when the basket is in normal position, these rails hang loosely at the front end of the basket and serve to assist in holding the bundles in place in the basket. A spreader D in the form of a vertical V shaped frame is centrally arranged in the basket with its apex pointing rearwardly, the upper end of said spreader being freely journaled upon the cross member 54, so that it will turn into vertical position as illustrated in Fig. 4, when the basket is normal and serves to divide the lower ends of the bundles apart and assist in causing the latter to assume stable standing position when they are deposited upon the ground. When the basket is tilted into bundle ejecting position, this spreader is free to slide with its forward side 56 on the ground and trail in the same manner as the guards 53.

Disposed on the upper portion of the shocker frame is a switch E, which is adapted to cause the bundles as they are received from the carrier to be deposited successively on opposite sides of the spreader in the basket. This switch consists of a freely journaled longitudinal shaft 60 carrying a switch wall 62 and an outstanding wall 63, (see Fig. 5) so arranged that first one bundle and then the other is guided automatically on opposite sides of the spreader. The friction of shaft 60 in the frame is sufficient to retard the swinging movement of the parting wall in either direction, except when influenced by the weight of a bundle, and a stop 60′ also serves to limit the movement of the switch in one direction.

The tilting of the basket into bundle ejecting position is accomplished by a thrust movement of the operating rod 65 on the binder by the operator, the movement of said lever causing the clutch shifting bar 66, mounted upon the brace 67 to move the drum 24 into clutch engaging position with the clutch driving element such as 27, which causes the drum to wind a cable 68 passing over a sheave 69 and secured to the upper forward end of the basket, thus drawing said upper forward end downwardly. When the bundles have been deposited upon the ground, the operating rod 65 is reversed, causing the drum 24 to engage by its clutch engaging element 26 the clutch driving element 28 and disengaging the clutch elements 25 and 27. This movement causes the opposite end portion 70 of the cable which is attached to the forward upper end of the basket to draw the latter back into normal position, whereupon the operating lever is released into neutral position.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:—

1. In combination with a harvesting machine, a shocker secured to said machine having a carrier disposed to receive and conduct the bundles from the harvester, a frame upon which said carrier is mounted having carrier wheels disposed to travel upon the ground, a basket having walls tiltingly mounted upon said frame and adapted to collect the bundles from said carrier and periodically deposit them upon the ground, a floor tiltingly mounted below said basket and movable into a position to release the bundles when said basket is tilted into bundle ejecting position, a spreader disposed in said basket and adapted to assist in arranging the bundles in inclined position to shock them upon the ground, guards arranged at the forward end of said basket for assisting in releasably holding the bundles in said basket as they are collected and means driven by said carrier wheels for raising and lowering said basket into bundle ejecting and bundle collecting positions.

2. In combination with a harvester, a shocker comprising a frame connected to said harvester and having carrier wheels for supporting the same, a basket arranged to receive and collect the bundles from said harvester having walls tiltingly mounted upon said frame and arranged to deposit the bundles with their butt ends standing upon the ground, a floor movably arranged at the lower end of said basket and adapted to lift and release the bundles when the basket is tilted into bundle releasing position, means for moving said basket and its floor either into normal bundle collecting position or bundle ejecting position and a spreader in said basket arranged to dispose the bundles with their butt ends spread apart and a switch for successively depositing the bundles as they are received from the harvester with their butt ends resting on opposite sides of said spreader.

3. In combination with a harvester, a shocker having a frame connected to said harvester, a basket arranged to receive the bundles from the harvester, said basket having walls tiltingly mounted upon said frame and rearwardly converging to arrange the bundles with their butt ends spread apart, a floor movably disposed in the lower end of said basket and upon which the bundles are received and supported upon their sides, means for tilting said basket with its walls converging upwardly, means attached to said floor and said basket for simultaneously lifting them into bundle releasing position, means for reversing the movement of said basket and floor to return the same into normal bundle collecting position, a spreader hung in said basket for separating the butt ends of the bundles therein and guards hung in the front end of said basket for assisting in holding the bundles in the basket, said spreader and guards being adapted to swing downwardly and trail upon the ground when said basket and floor are raised into superior position.

In testimony whereof, I have signed my name to this specification.

PEDER TOVSEN.

Copies of this patent may be obtained for five cents each, by addressing the "Commissioner of Patents, Washington, D. C."